G. & C. Meader,
Corn Harvester.

No. 110,061.  Patented Dec. 18, 1870.

WITNESSES:  INVENTORS:

United States Patent Office.

GEORGE MEADER AND CHARLES MEADER, OF PRAIRIE CENTRE, ILLINOIS.

Letters Patent No. 110,061, dated December 13, 1870.

IMPROVEMENT IN FIELD CORN-PICKING AND HUSKING-MACHINES.

The Schedule referred to in these Letters Patent and making part of the same.

*To all whom it may concern:*

Be it known that we, GEORGE MEADER and CHARLES MEADER, of Prairie Centre, in the county of La Salle and State of Illinois, have invented a new and useful improvement in Corn-Huskers; and we do hereby declare the following to be a full, clear, and exact description of the same, reference being had to the accompanying drawing and the letters and figures marked thereon which form a part of this specification, in which—

Figure 1:
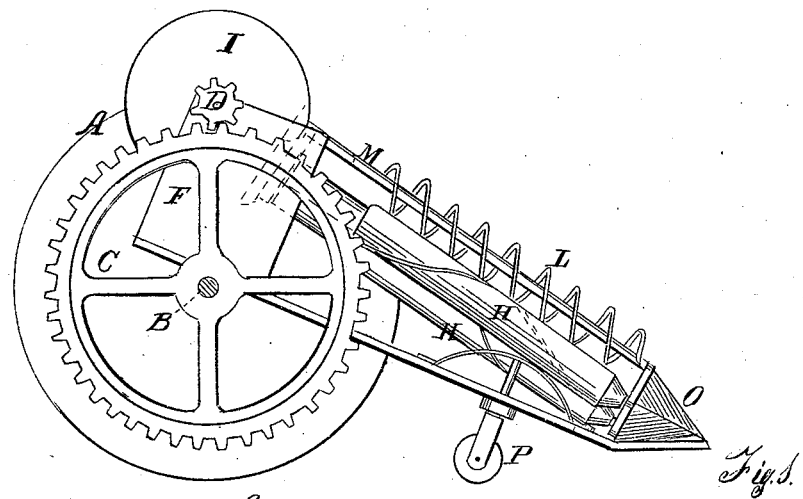

Figure 1 represents a side elevation of our machine, and

Figure 2:
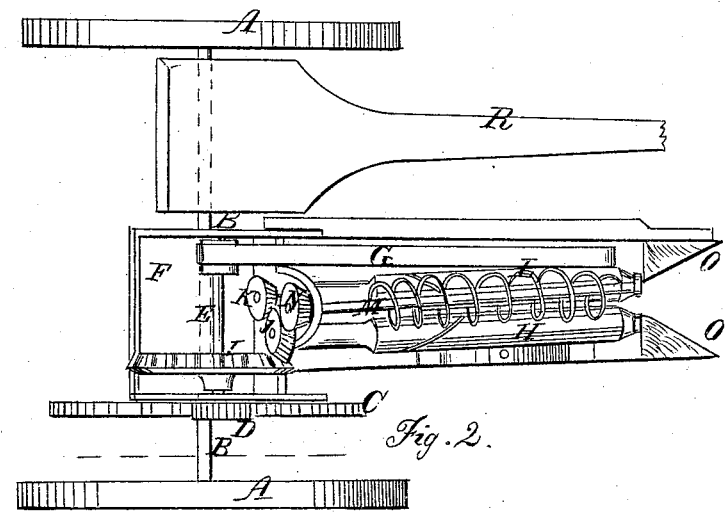

Figure 2, a top or plan view of the same.

The nature of our invention consists in the combination of spirally grooved rollers for husking the corn, with a spiral elevator for elevating the same, arranged and operating in the manner hereafter more fully described.

To enable those skilled in the art to understand how to manufacture and use our invention, we will proceed to describe the same with particularity.

The same letters of reference refer to the corresponding parts in the different figures.

In the annexed drawing—

A represents the wheels of the machine, and

B, the axle.

There is a cog-wheel, C, on the axle B that is driven by it and that engages with the spur-wheel D, and drives the shaft E, that has its bearings in the frame F.

The husking-rollers H have bearings in the frame F, and are driven by the bevel-wheel I on the shaft E.

The rollers H are so geared that they revolve toward each other, so as to carry the husk, as it is stripped from the corn, down between them.

This is done by having the bevel J engage with the wheel I.

J being on the end of one of the rollers H, and having the bevel-wheel K, which is on the other roller H, engage with the wheel J, so as to be driven by it.

L is a spiral rod, hung on a shaft or rod, M, just above and between the rollers H, in such a position as to gather the corn and carry it up on the rollers H.

It is revolved by the bevel-wheel N, which is on the shaft M, engaging with the bevel-wheel J.

There are also gatherers, O, attached to the frame F, which, running on each side of the row of corn, gathers the stalks and guides them between the rollers H.

The front end of the frame F rests on the wheel P, and is carried near the ground so that the gatherers pass under all the lodged stalks, and guide them to the husking-rollers.

The husking-rollers are also inclined, so that the stalks will pass between them below the ears of corn, and before they pass out from between them they will slip through between the rollers so far that the rollers will strip the ears from the stalk.

The upper ends of the rollers are made slightly smaller than the rest of the rollers, so as to give more space for the stalks to pass through between the rollers, and the rollers are also so hung in the frame that there is more space between them at their lower ends when the stalks first pass between them.

The rollers may be extended forward, the ends diverging so that they would act as gatherers as well as huskers, thus dispensing with the gatherers O altogether.

There is an endless band or apron, Q, running over a pulley on the shaft E, to elevate the ears of corn after they are husked into a box or cart attached to the machine.

The husking-roller H next to the elevator Q is a little lower than the other husking-roller, so that the corn is discharged over that roller upon the elevator Q, to be carried up as above described.

R is the draft-tongue or pole of the machine, and is attached to the axle B in any suitable manner.

We are aware that spirally grooved rollers have been used for husking corn. We are also aware that a spiral elevator has been used in a field-operating corn-husker, and we, therefore, do not broadly claim such.

Having thus described the construction and operation of our improved machine,

What we claim, and desire to secure by Letters Patent, is—

In a field-operating corn-picker and husker the spirally grooved husking-rollers H in combination with the spiral elevator L, when said parts are constructed substantially as described and arranged to operate in the manner specified and shown.

GEORGE MEADER.
CHARLES MEADER.

Witnesses:
GEORGE W. FORD,
W. H. TIBBLES.